United States Patent Office 3,503,939
Patented Mar. 31, 1970

3,503,939
POLYAMIDES FROM HETEROCYCLIC DIAMINES
Meurig Wyn Williams, Old Colonial Village, Wilmington, Del., assignor to E. I. du Pont de Nemours and Company, Wilmington, Del., a corporation of Delaware
No Drawing. Filed Mar. 29, 1967, Ser. No. 626,710
Int. Cl. C08g 20/00
U.S. Cl. 260—78                                     2 Claims

ABSTRACT OF THE DISCLOSURE

Novel high-melting, thermally- and photolytically-stable, fiber- and film-forming polyamides, polyureas and polyurethanes are prepared by reacting heterocyclic secondary diamines corresponding to the formula $$\begin{array}{c} H\ Q_1 \quad Q_2\ H \\ \diagdown\ /\\ C\text{———}(C)_n\text{———}C \\ /\ \ H \quad\ \ H\ \ \diagdown \\ HN \quad\quad\quad\quad NH \\ \diagdown\ \ H \quad\ \ H\ \ / \\ C\text{———}(C)_n\text{———}C \\ /\ \diagup \quad \diagdown \\ H\ Q_1 \quad\ Q_2\ H \end{array}$$

I wherein $n$ is a cardinal number from 1 to 10, and $Q_1$ and $Q_2$ are hydrogen, lower alkyl or phenyl, with appropriate difunctional reactants.

Certain novel heterocyclic diamines whose structures may be represented by the formulas II and III wherein $R_1$ and $R_2$ are lower alkyl radicals or phenyl radicals, and Y is hydrogen, lower alkyl or aralkyl (e.g., benzyl) are also provided.

BACKGROUND OF THE INVENTION

Polymers prepared from heterocyclic secondary diamines have been known for a long time, but they have not attained the commercial prominence enjoyed by polymers obtained from alkylene or carbocyclic diamines. Many known polyurethanes prepared from heterocyclic secondary diamines exhibit poor chemical stability at temperatures required for melt processing or posses insufficient solubility for use of conventional solvent processing techniques, both properties limiting their use in the preparation of, for example, fibers and films.

Known high melting polyamides prepared from heterocyclic secondary diamines often exhibit low resistance to photolytic degradation. This requires that stabilizing compounds be combined with these polymers if they are to be shaped into articles which will be exposed to light, thus increasing the cost of the final article. Further, filaments of polyamides prepared from heterocyclic secondary diamines frequently exhibit transverse tensile properties which are unduly low, a serious limitation to their use in woven or knitted fabrics. In this regard, it is pointed out in "The Journal of the Textile Institute," vol. 38, page T43 (1947) that fibers which, though of very high tensile strength, break very easily on bending, may be less serviceable in use in twisted cord or woven fabric than weaker, more flexible fibers.

SUMMARY OF THE INVENTION AND DESCRIPTION OF THE PREFERRED EMBODIMENTS

This invention provides high molecular weight fiber- and film-forming polymers containing amide, urethane, or urea linkages, said polymers consisting essentially of recurring units having the structure represented by Formula IV

IV $$\begin{array}{c} H\ Q_1 \quad Q_2\ H \\ \diagdown\ /\\ C\text{———}(C)_n\text{———}C \\ /\ \ H \quad\ \ H\ \ \diagdown\quad\quad\quad O\ \ \ H\quad\quad H\ \ \ O \\ -N \quad\quad\quad\quad N\text{—}C\text{—}(O)_m\text{—}(N)_p\text{—}R_3\text{—}(N)_p\text{—}(O)_m\text{—}C\text{—} \\ \diagdown\ \ H \quad\ \ H\ \ / \\ C\text{———}(C)_n\text{———}C \\ /\ \diagup \quad \diagdown \\ H\ Q_1 \quad\ Q_2\ H \end{array}$$

wherein $n$ represents a cardinal number from 1 to 10; $m$ is 0 or 1; $p$ is 0 or 1, with the proviso that when $p$ is 1, $m$ is 0; $Q_1$ and $Q_2$ which may be the same or different represent hydrogen atoms or alkyl radicals of from 1 to 4 carbon atoms (e.g., methyl, ethyl, propyl, butyl radicals) or phenyl radicals; and $R_3$ represents a divalent organic radical of up to about 20 carbon atoms and which may additionally contain up to about 6 atoms selected from the group of oxygen, nitrogen, sulfur, and halogen.

The novel heterocyclic diamines represented by structural Formulas II and III may be prepared from appropriately substituted β-aminopropionaldehydes. For example, as shown below, β-benzylamino-α,α-dimethylpropionaldehyde (obtained by reacting isobutyraldehyde, paraformaldehyde, and benzylamine hydrochloride) may be warmed in the presence of methanesulfonic acid to form 2,6 - dibenzyl-4,4,8,8-tetramethyl-9-oxa-2,6-diazabicyclo[3.3.1]nonane, (IIa), whose oxygen bridge may be selectively reduced, e.g., with lithium aluminum hydride to 1,5 - dibenzyl-3,3,7,7-tetramethyl-1,5-diazocyclooctane, (IIIa), which, in turn, may be catalytically hydrogenated with, e.g., palladium on carbon (in ethanol), to 3,3,7,7-tetramethyl-1,5-diazacyclooctane, (IIIb):

$$\begin{array}{c} CH_3 \\ \diagdown \\ \phantom{CH_3}\text{—CHO} \\ CH_3 \\ \diagup \\ CH_2\text{—NHCH}_2\phi \end{array} \xrightarrow{H^+} \phi CH_2\text{—N}\begin{array}{c} CH_3\ CH_3 \\ \diagup \diagdown \\ O \\ \diagdown \diagup \\ CH_2\ CH_3 \end{array}\text{N—CH}_2\phi \xrightarrow{LiAlH_4}$$

IIa $$H\text{—N}\begin{array}{c} CH_3\ CH_3 \\ \diagup \diagdown \\ \\ \diagdown \diagup \\ CH_3\ CH_3 \end{array}\text{N—H} \xleftarrow{\underset{Ethanol}{Pd/C}} \phi CH_2\text{—N}\begin{array}{c} CH_3\ CH_3 \\ \diagup \diagdown \\ \\ \diagdown \diagup \\ CH_3\ CH_3 \end{array}\text{N—CH}_2\phi$$

IIIb                                IIIa

In a similar manner, 2,4,4,6,8,8-hexamethyl-9-oxa-2,6-diazabicyclo[3.3.1]nonane, (IIb), may be reduced to 1,3,3,5,7,7-hexamethyl-1,5-diazacyclooctane, (IIIc):

$$CH_3\text{—N}\begin{array}{c} CH_3\ CH_3 \\ \diagup \diagdown \\ O \\ \diagdown \diagup \\ CH_3\ CH_3 \end{array}\text{N—CH}_3 \xrightarrow{LiAlH_4} CH_3\text{—N}\begin{array}{c} CH_3\ CH_3 \\ \diagup \diagdown \\ \\ \diagdown \diagup \\ CH_3\ CH_3 \end{array}\text{N—CH}_3$$

IIb                                IIIc

In the above sequence replacing isobutyraldehyde with, e.g., diethylacetaldehyde, di-n-propylacetaldehyde, di-n-butylacetaldehyde, ethyl-n-butylacetaldehyde, ethyl-n- propylacetaldehyde, or methylphenylacetaldehyde yields β-benzylamino - α,α - diethylpropionaldehyde, β-benzylamino-α,α-di-n-propylpropionaldehyde, β - benzylamino-α,α-di-n-butylpropionaldehyde, β-benzylamino - α - ethyl-α-butyl - propionaldehyde, β - benzylamino - α - ethyl-α-n-propylpropionaldehyde, β-benzylamino - α - methyl-α-phenylpropionaldehyde, respectively, from which ultimately are prepared:

3,3,7,7 - tetraethyl - 1,5-diazacyclooctane
3,3,7,7-tetra-n-propyl-1,5-diazacyclooctane
3,3,7,7-tetra-n-butyl-1,5-diazacyclooctane
3,7-diethyl-3,7-di-n-butyl-1,5-diazacyclooctane
3,7-diethyl-3,7-di-n-propyl-1,5-diazacyclooctane
3,7-dimethyl-3,7-diphenyl-1,5-diazacyclooctane via the appropriate 2,6-dibenzyl - 9 - oxa bicyclic-[3.3.1] nonane and 1,5-dibenzyl - 1,5-diazacyclooctane precursors.

The novel reduction of an ether bridge in the presence of a benzyl group, e.g., in going from (IIa) to (IIIa), above, is entirely unexpected. Also unexpected is the observed failure of catalytic hydrogenation (e.g., palladium on carbon, in ethanol) to remove the N-benzyl groups from the oxygen-bridged (IIa), although these groups are readily cleaved from the deoxygenated (IIIa) in preparing (IIIb). The novel heterocyclic diamines of the Formulas II and III are variously useful as polymer intermediates as selective metal complexing agents, and as metal carriers for plant and soil treatments, fungicides, herbicides, insecticides, etc.

In the Formula I diamines, $Q_1$ and $Q_2$ may be the same or different. By "lower alkyl" is meant alkyl radicals containing 1–4 carbon atoms (e.g., methyl ethyl, propyl, butyl radicals). Among the useful Formula I diamines may be named 1,6-diazacyclodecane; 1,7-diazacyclododecane; 1,8-diazacyclotetradecane; 1,10-diazacyclooctadecane; 1,11-diazacycloeicosane; 1,12 - diazacyclodocosane; and the like. The latter diamines may be prepared, for example, by the procedures of Stelter and Marx, Ann., 607, 59–66 (1957) or of Muller and Kindlman, Ber., 74B, 416 (1941). Advantageously employed are the novel alkyl- and aryl - substituted-1,5-diazacyclooctanes prepared by the present invention (III, Y=H). Mixtures of Formula I diamines may be employed. Up to about 10% by weight (based on total diamine content of the polymer) of diamines not conforming to Formula I may also be employed. Among the latter may be named m-phenylenediamine, p-phenylenediamine, 1,4-diamino - cyclohexane, ethylene diamine, hexamethylene diamine, and the like.

Reagents useful with the aforesaid diamines for preparing the novel polymers of the present invention include organic dicarboxylic acids and their amide-forming derivatives, bisphenols and glycols and their urethane-forming derivatives, and diisocyanates. The useful dicarboxylic acids correspond to the formula

V        HOOC—$R_3$—COOH wherein $R_3$ has the significance set forth hereinbefore. Among the dicarboxylic acids useful in the present invention may be named isophthalic; terephthalic, 5-chloroisophthalic; 5-tert, butylisophthalic; 4,4'-bibenzoic; 2,6-naphthalene dicarboxylic; 1,8-naphthalene dicarboxylic; 1,2-bis(4 - carboxyphenyl)ethane; 1,2 - bis(4 - carboxyphenoxy)ethane; bis(4 - carboxyphenyl)ether; bis(4 - carboxyphenyl)sulfone; 2,2-bis(3,5 - dichloro - 4 - carboxyphenyl)propane; adipic; suberic, azelaic, sebacic; undecandioic; dodecandioic; and the like. These dicarboxylic acids are conveniently employed in the form of their dicarbonyl halides which are readily prepared by well-known methods; the diacid chloride is usually preferred.

Useful bisphenols and glycols correspond to the formula

VI        HO—$R_3$—OH wherein $R_3$ has the significance set forth hereinbefore. These include hydroquinone; 4,4' isopropylidene bisphenol; 4,4' - isopropylidene bis(2,6 - dichlorophenol); 4,4' - isopropylidene bis(2,6 - dibromophenol); 4,4'-isopropylidene bis(2,6-dimethylphenol); 4,4' - isopropylidene bis(2 - chlorophenol); 4,4'-methylene bisphenol; 4,4'-oxy bisphenol; 4,4'-ethylidene bisphenol; 4,4'-sulfonyl bisphenol; ethylene glycol; trimethylene glycol; 2-methyltetramethylene glycol; 2,2-dimethyltrimethylene glycol; and the like. For the polymerizations of this invention, these bisphenols and glycols are conveniently employed as there bischloroformates.

Useful diisocyanates correspond to the formula

VII        O=C=N—$R_3$—N=C=O wherein $R_3$ has the significance set forth hereinbefore and include hexamethylene diisocyanate; decamethylene diisocyanate; m-phenylene diisocyanate; p-phenylene diisocyanate; bis(4-isocyanatophenyl)methane; 2,4-tolylene diisocyanate; 4,4'-diisocyanatobiphenyl; bis(4 - isocyanatophenyl)sulfone; bis(4 - isocyanatophenyl)ether; 2,2-bis(4-isocyanatophenyl)propane; and the like.

The preferred polyamide of this invention is poly (3,3,7,7 - tetramethyl-1,5-diazacyclooctane terephthalamide). Poly[4,4' - isopropylidene bis(2,6 - dichlorophenylene) 3,3,7,7-tetramethyl - 1,5 - diazacyclooctane - 1,5 - dicarboxylate] is the preferred polyurethane.

Although they are not necessary in the preparation of the polymers of this invention, various chain terminators may be employed in the polymerizations. Among the suitable chain terminators are monofunctional compounds which can react with the appropriate ends of these polymers such as ammonia, monoamines (e.g., methylamine, dimethylamine, ethylamine, butylamine, dibutylamine, cyclohexylamine, aniline, etc.), N,N-diethylethylenediamine, hydroxylic compounds such as methyl alcohol, ethyl alcohol, isopropyl alcohol, phenol, water, etc., other acid chlorides (e.g., acetyl chloride), acid anhydrides (e.g., acetic anhydride, phthalic anhydride, etc.), and isocyanates (e.g., phenyl isocyanate, m-tolyl isocyanate, ethyl isocyanate, etc.).

The polyamides consisting essentially of the following recurring units

VIII
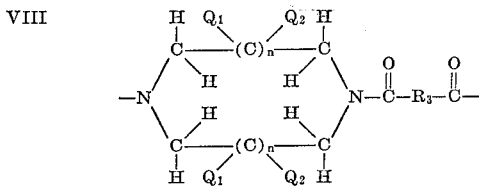

and polyurethanes consisting essentially of the following recurring units

IX
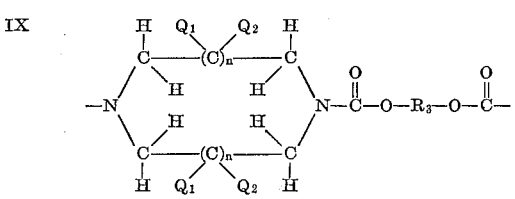

of the present invention, where $R_3$ is as defined above, may be prepared from nearly equimolar amounts of a Formula I diamine and the appropriate diacid chloride or bischloroformate by interfacial polymerization which is accomplished by dissolving the diamine in aqueous alkali, dissolving the diacid chloride or bischloroformate in a water-immiscible organic solvent, and combining the two phases with vigorous agitation. An accelerator such as a quaternary ammonium salt (e.g., tetraethylammonium chloride), may also be employed. A second organic solvent, different from the one in which the diacid chloride or bischloroformate was dissolved, may be added at the conclusion of the reaction to precipitate the polymer. The polyureas of this invention consisting essentially of the following recurring units

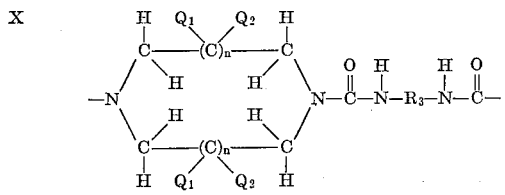

are advantageously prepared by reacting a Formula I diamine with the appropriate diisocyanate by solution polymerization procedures well known in the art.

The polymers of this invention can be cast into films or solution spun into filamentary form from solutions containing about 10 to 30% by weight of the polymer dissolved in a solvent variously selected from the class consisting of chloroform, formic acid, m-cresol, cyclohexanone, ethylene chlorohydrin, N,N-dimethylformamide, 2,2,3,3-tetrafluoropropanol, a mixture of chloroform/methanol (88/12, wt./wt.), and a mixture of 1,1,2-trichloroethane/formic acid (70/30, wt./wt.). Filaments can also be prepared by conventional melt spinning techniques.

The excellent photolytic stabilities, thermal stabilities, high melting points, and ready solubilities in available solvents favor the use of the polymers of this invention in commercial applications such as fibers, textile applications, films, coatings, moldings, adhesives, and the like.

The following non-limiting examples are illustrative of the practice of the preferred embodiment of this invention. In these examples, inherent viscosity ($\eta_{inh}$) has been determined in accordance with the following equation $$\eta_{inh} = \frac{\ln(\eta_{rel})}{(C)}$$

wherein ($\eta_{rel}$) represents the relative viscosity and (C) represents a concentration of 0.5 gram of the polymer in 100 ml. of the solution. The relative viscosity ($\eta_{rel}$) is determined by dividing the flow time in a capillary viscometer in a dilute solution of the polymer by the flow time for the pure solvent. The dilute solutions used herein for determining ($\eta_{rel}$) are of the concentration expressed by (C) above; the flow times are determined at 30° C. and, unless otherwise specified, are measured in m-cresol. As used herein, the "polymer melt temperature," abbreviated "PMT," is defined as that temperature at which a polymer sample leaves a molten trail when moved across a hot metal surface under moderate pressure. Filament tenacity, elongation, and modulus are coded as "T/E/Mi" and are in units of grams/denier, percent, and grams/denier, respectively. The terms work recovery and tensile recovery, coded as WR and TR, respectively, are reported in percent and are used as defined in Beaman and Cramer, J. Poly. Sci. vol. 21, 228 (1956). The subscripts on WR and TR refer to the percent elongation (e.g., 3%, 5%). Tensile measurements are determined under room temperature conditions (e.g., 21.1° C. and 65% relative humidity).

Thermogravimetric analysis (TGA) thermograms which provided the TGA data presented herein for the various polymers were obtained on an apparatus incorporating the cell unit of the Du Pont 950 Thermogravimetric Analyzer. TGA analyses were carried out in a slowly flowing stream of nitrogen or air at a programmed rate of temperature rise of 10° C. per minute. Photolytic stability measurements reported herein for polymeric films were performed in a model FDA-R Fade-Ometer (Product of the Atlas Electric Devices Co., Chicago, Ill.) in which the carbon arc is replaced by a xenon-filled lamp, type Osram XBF–6000, which is water cooled and has a minimum coolant flow of 6 l. per minute, an AC-current supply voltage of 208 volts, an operating voltage of 135 volts, an operating amperage of 45 amperes, and a rated power of 6000 watts. The film samples are placed on white cardboard strips mounted on the rotating framework of the Fade-Ometer at a distance of 10 inches from the center of the lamp. The temperature surrounding the samples is about 165° F.

EXAMPLE I

This example illustrates the preparation of β-benzylamino-α,α-dimethylpropionaldehyde.

A reaction mixture comprising isobutyraldehyde (81 g., 1.125 moles), paraformaldehyde (42 g., 1.4 moles), and benzylamine hydrochloride (150 g., 1.05 moles) is stirred vigorously and heated at 100° C. for 4 hours. The reaction mixture is cooled, water (200 ml.) added, and the resulting mixture extracted with ether (200 ml.). The aqueous solution is made alkaline with a solution of 100 g. of potassium hydroxide in 100 ml. of water and extracted with ether (3×200 ml.). The combined ether extracts are dried over anhydrous sodium sulfate, filtered, and the ether removed. The residue is distilled and the main fraction is collected at 93–100° C./0.75 mm. (103 g.). This fraction is redistilled (74° C./0.025 mm.) to give 86 g. of β-benzylamino-α,α-dimethylpropionaldehyde, $n_D^{24}$=1.5113. The elemental analysis is consistent with this structure.

EXAMPLE II

This example illustrates the preparation of 2,6-dibenzyl-4,4,8,8-tetramethyl - 9 - oxa-2,6 - diazabicyclo-[3.3.1] nonane.

β-Benzylamino-α,α-dimethylpropionaldehyde (85 g.) is heated to 50° C. overnight in the presence of two drops of methanesulfonic acid. Hexane (100 ml.) is added and the resulting mixture filtered. The solid isolated is washed with hexane and dried to produce 40 g. of crude product. The latter is recrystallized from ethyl acetate to yield 2,6-dibenzyl-4,4,8,8-tetramethyl-9-oxa-2,6-diazabicyclo [3.3.1]nonane, M.P.=155–157.5° C. The elemental and nuclear magnetic resonance analyses are in agreement with the proposed structure.

EXAMPLE III

This example illustrates the preparation of 1,5-dibenzyl - 3,3,7,7 - tetramethyl - 1,5 - diazacyclooctane.

2,6 - dibenzyl - 4,4,8,8 - tetramethyl - 9 - oxa - 2,6-diazabicyclo[3.3.1]nonane (36.4 g., 0.1 mole) is added portion wise over five minutes to a well-stirred suspension of lithium aluminum hydride (20 g., 0.6 mole) in ether (800 ml.). The resulting mixture is stirred at room temperature for one hour, then refluxed for two hours, after which it is cooled in ice water. The excess reducing reagent decomposed by the addition of ethyl acetate and water. The ether solution is isolated by decantation, dried over anhydrous magnesium sulfate, and the ether removed to leave a syrup which rapidly crystallizes to a solid, 27.5 g. The solid is recrystallized from methanol to yield 1,5-dibenzyl-3,3,7,7-tetramethyl-1,5-diazacyclooctane, M.P. 49–50° C. The elemental and nuclear magnetic resonance analyses are in good agreement for the desired product.

EXAMPLE IV

This example illustrates the preparation of 3,3,7,7-tetramethyl-1,5-diazacyclooctane by reduction of the product prepared in Example III above.

1,5 - dibenzyl - 3,3,7,7 - tetramethyl - 1,5 - diazacyclooctane (17.5 g., 0.05 mole) is dissolved in ethanol (120 ml.) and reduced with hydrogen, using 10% Pd/C (5 g.) as a catalyst. After hydrogen uptake is complete (30 min.), the catalyst is filtered off and the ethanol removed to leave 8.4 g. of solid product. The diamine product is triturated with warm water, then distilled from potassium hydroxide at 110° C./10 mm., and finally sublimed from barium oxide to yield 3,3,7,7-tetramethyl-1,5-diazacyclooctane, M.P.=69–70° C. The elemental and nuclear resonance analyses are in good agreement with the proposed structure.

EXAMPLE V

This example illustrates the preparation of organic acid salts of 3,3,7,7-tetramethyl-1,5-diazacyclooctane.

A solution of acetic acid (9 g., 0.15 mole) in 350 ml. of absolute ether is added to a solution of 3,3,7,7-tetramethyl-1,5-diazacylooctane (20 g., 0.118 mole) in 350 ml. of absolute ether. The resulting solution is cooled in ice to give crystals which are recrystallized from ether to give white needles of the monoacetate salt of 3,3,7,7-tetramethyl-1,5-diazacyclooctane, M.P. 113.5–114° C., 18.5 g., 69% yield.

When ethanol solutions containing essentially equimolar quantities of 3,3,7,7-tetramethyl-1,5-diazacyclooctane and adipic acid are reacted and the product worked up according to the procedure of the previous paragraph, there is obtained the adipic acid salt of 3,3,7,7-tetramethyl-1,5-diazacyclooctane as white crystals, M.P. =141–142° C. (from ethanol).

EXAMPLE VI

This example illustrates the preparation of 1,3,3,5,7,7-hexamethyl-1,5-diazacyclooctane.

To a stirred suspension of lithium aluminum hydride (35 g., 1.0 mole) in ether (600 ml.) is added 2,4,4,6,8,8-hexamethyl - 9-oxa-2,6-diazabicyclo[3.3.1]nonane (106 g., 0.5 mole) in portions over a 15 minute interval. The resulting mixture is refluxed for one hour, cooled, and the excess reducing agent decomposed by adding ethyl acetate (200 ml.) and water (200 ml.) until a pale gray precipitate is formed. The ether is then decanted from the precipitate, dried over anhydrous magnesium sulfate, and evaporated. The residue remaining is distilled to give 1,3,3,5,7,7-hexamethyl-1,5-diazacyclooctane, B.P. 96° C./25 mm., 78 g. The elemental and nuclear magnetic resonance analyses are consistent for this product.

EXAMPLE VII

This example illustrates the preparation of poly(3,3,7,7-tetramethyl - 1,5-diazacyclooctane terephthalamide) by interfacial polymerization.

Into a stainless steel Waring Blendor of 1 gallon capacity are placed the monoacetate salt of 3,3,7,7-tetramethyl-1,5-diazacyclooctane (39.1 g., 0.17 mole) in 580 ml. of water, sodium hydroxide (20.8 g., 0.52 mole) in 580 ml. of water, chloroform (960 ml., freshly chromatographed on acid washed alumina). While the combined ingredients are rapidly agitated, a solution of terephthaloyl chloride (34.5 g., 0.17 mole) in chloroform (190 ml., chromatographed on acid-washed alumina) is added as rapidly as possible to the center of the vortex created by the stirring blade. The combined ingredients are stirred for 5 minutes, after which n-hexane is added to the blendor to coagulate the polymer. The polymer is isolated, washed with water (2×600 ml.) at room temperature and vacuum dried. The essentially chloroform-free product is washed further with acetone (2×500 ml.) and dried at 75° C./1 mm. to produce 47.0 g. of poly(3,3,7,7 - tetramethyl - 1,5 - diazacyclooctane terephthalamide), $\eta_{inh}$=1.34, PMT>360° C.

EXAMPLE VIII

The preparation of poly(ethylene 3,3,7,7-tetramethyl-1,5 - diazacyclooctane - 1,5 - dicarboxylate) by interfacial polymerization is illustrated in this example.

Into a blender are placed the monoacetate salt of 3,3,7,7-tetramethyl-1-1,5-diazacyclooctane (5.06 g., 0.022 mole) in 40 ml. of water, sodium hydroxide (7.00 g., 0.066 mole) and 1.60 g. Duponol® ME (Du Pont's registered trademark for a surface active agent comprising sodium lauryl sulfate) in 40 ml. of water and 20 ml. of distilled benzene; all ingredients are at 5° C. While the combined ingredients are rapidly stirred, a solution of ethylene glycol bischloroformate (4.11 g., 0.022 mole) in 30 ml. of benzene, cooled to 5° C., is rapidly added and the contents of the blender stirred for 5 additional minutes. n-Hexane is added to precipitate the polymer and the resulting emulsion is broken up by the addition thereto of ammonium chloride. The emulsion reforms upon adding water to the blender; the emulsion is then broken by the addition of 50 ml. of ether and 50 ml. of tetrahydrofuran. The polymer is collected, washed vigorously with water, and dried to give poly(ethylene 3,3,7,7-tetramethyl-1,5 - diazacyclooctane - 1,5 - dicarboxy late), 4.0 g., $\eta_{inh}$=0.64, PMT=225° C.

EXAMPLE IX

The preparation of poly[4,4' - isopropylidene bis(2,6-dichlorophenylene) 3,3,7,7-tetramethyl - 1,5 - diazacyclooctane-1,5-dicarboxylate] is illustrated in this example.

Into a blender are placed 3,3,7,7-tetramethyl-1,5-diazacyclooctane monoacetate (5.75 g., 0.025 mole, thrice recrystallized from ether) in 75 ml. of water and sodium carbonate (8.75 g., 0.083 mole) in 75 ml. of water. While the contents of the blender are rapidly stirred, 2,2-bis(4-hydroxy - 3,5 - dichlorophenol)propane bischloroformate (12.27 g., 0.025 mole) in 50 ml. of 1,2-dichloroethane (50 ml., chromatographed on acid-washed alumina), cooled to 5° C., are rapidly added and the contents of the blender stirred for 5 additional minutes. The product, precipitated by adding n-hexane, is isolated, washed with water, and dried to give poly[4,4'-isopropylidene bis(2,6-dichlorophenylene) 3,3,7,7-tetramethyl1-1,5-diazacyclooctane-1,5-dicarboxylate], 13.8 g., $\eta_{inh}$=0.63, PMT=340° C.

EXAMPLE X

This example illustrates the preparation of poly(4,4'-methylenediphenyleneurea 1,12 - diazacyclodocos - 1,12-yleneurea) by solution polymerization.

To a solution of bis(4-isocyanatophenyl)methane (6.51 g., 0.026 mole) in 160 ml. of a mixture (70/30, v./v.) of tetramethylene sulfone/chloroform (chromatographed), stirred in a blender of one-gallon capacity, is added a solution of 1,12-diazacyclodocosane (8.06 g., 0.026 mole) in 160 ml. of the above-cited solvent mixture. After the combined contents of the blender are stirred for 5 minutes, 200 ml. of 4% aqueous butylamine are added, and stirring is continued for 5 additional minutes. Water is then added to precipitate the polymer which is collected, washed successively with water, dilute acetic acid, and water, and finally dried at 100° C./1 mm. There are obtained 13.8 g. of poly(4,-4'-methylenediphenyleneurea-1,12-diazacyclodocos - 1,12 - yleneurea), $\eta_{inh}$=1.00 (sulfuric acid), PMT=205° C., characterized by repeating units of the formula:

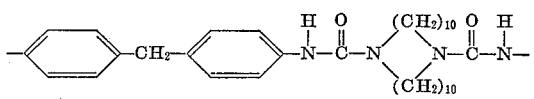

Properties of other polymers prepared in accordance with this invention are summarized in the following Table I-A. Each of these polymers is prepared according to the general procedure of Example VII by reacting the appropriate Formula I diamine with the appropriate Formula V diacid chloride or bischloroformate of the appropriate Formula VI bisphenol. Each consists of recurring units of Formula IV specified hereinabove and reproduced here for easy reference:

IV

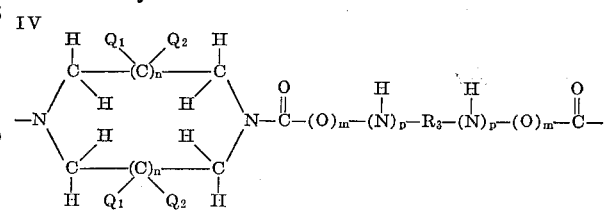

wherein $n$, $m$, $Q_1$, $Q_2$, and $R_3$ are identified for each example; for each of the Table I-A polymers, p=0.

TABLE I-A

| Example | n | m | $Q_1$ | $Q_2$ | $R_3$ | PMT, °C. | η inch |
|---|---|---|---|---|---|---|---|
| XII | 1 | 0 | $CH_3$ | $CH_3$ | 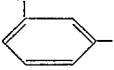 | 360 | 1.93 |
| XIII | 1 | 0 | $CH_3$ | $CH_3$ | $-(CH_2)_4-$ | 260 | [1] 0.59 |
| XIV | 4 | 0 | H | H |  | 360 | 2.04 |
| XV | 8 | 1 | H | H | 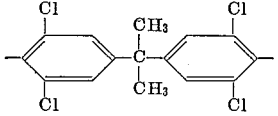 | 200 | 0.57 |
| XVI | 5 | 0 | H | H |  | 190 | 0.23 |
| XVII | 5 | 0 | H | H | 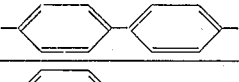 | >360 | 2.17 |
| XVIII | 6 | 0 | H | H | 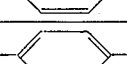 | 220 | 0.69 |
| XIX | 6 | 0 | H | H | 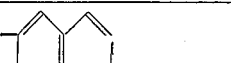 | >360 | 2.51 |
| XX | 8 | 0 | H | H |  | >360 | 2.26 |
| XXI | 8 | 0 | H | H | 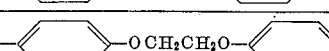 | >360 | 3.53 |
| XXII | 8 | 0 | H | H |  | 360 | [2] 3.38 |
| XXIII | 8 | 0 | H | H | 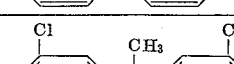 | 360 | 2.26 |
| XXIV | 4 | 1 | H | H | 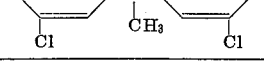 | 360 | 0.57 |
| XXV | 5 | 1 | H | H | 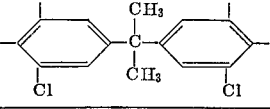 | 300 | 0.35 |

[1] Measured in chloroform.
[2] Measured in conc. sulfuric acid.

Presented below in Table I-B are conditions under which filaments and films are prepared from various polymers described in Table I-A. The column entitled "Method" identifies either the solvent used to prepare the solutions from which the respective films are cast or filaments (fiber) dry spun or else denotes that a melt procedure is employed. The "Solids Content" column identifies the weight percent solids present in the solutions utilized.

TABLE I-B

| Item | Polymer source, Table I-A, Example | Product | Method | Solids content, percent |
|---|---|---|---|---|
| a | XIII | Film | B | 5 |
| b | XIV | do | C | 15 |
| c | XVI | do | A | 10 |
| d | XVII | do | A | 10 |
| e | XVIII | Fiber | (¹) | |
| f | XIX | do | A | 5 |
| g | XX | do | A | 10 |
| h | XXIII | Fiber | A | 12 |
| i | XXIV | Film | A | 10 |
| j | XV | do | A | 10 |

[1] Melt spun, 207° C.
A—Chloroform/methanol (88/12, wt./wt.)
B—2,2,3,3,-tetrafluoropropanol.
C—N,N-dimethylformamide.

EXAMPLE XXVII

This example illustrates the preparation of filaments of poly(3,3,7,7-tetramethyl-1,5-diazacyclooctane terephthalamide) possessing good transverse (e.g., loop and knot) tensile properties.

A 25 g. sample of polyamide prepared according to the procedure of Example VII, but with $\eta_{inh}=1.5$, is ground overnight in a ball mill jar. The ground sample is slowly dissolved (under nitrogen) at 60° C. in 100 ml. of a mixture of trichloroethane/formic acid (70/30, v./v.) in a 500 ml. resin kettle, using a stainless steel disc stirrer, to form a light yellow orange spinning solution containing 20% solids. This solution, maintained at 50° C. is extruded at a pressure of 100 lb./in.² through a heated (84–96° C.) spinneret having 5 holes of 0.005 inch diameter, each, into a drying column whose walls are kept within the range of 149°–158° C. and which is swept with a cocurrent stream (4.5 ft.³/min.) of dry nitrogen which enters the column at 170–175° C. After a finish solution is applied to the emerging filaments, they are wound up on a bobbin at the rate of 120 yd./min. The freshly extruded fiber ($\eta_{inh}=1.0$) has a peanut-shaped cross section.

A yarn composed of 30 filaments of the above-prepared fiber is drawn 3× in a steam tube (12 lb. steam). The yarn is then boiled off (taut) for 3 hours in a mixture of water/N,N-dimethylformamide (50/50, v./v.) to produce highly crystalline filaments (2.6 denier/filament) exhibiting the following tensile properties:

TABLE II

| | T | E | Mi |
|---|---|---|---|
| Regular | 1.1 | 21 | 37 |
| Loop | 0.8 | 9 | 28 |
| Knot | 1.0 | 25 | 26 |

$TR_5=79$; $WR_5=59$.

In contrast to the above filaments, crystalline filaments of poly(2,5-dimethyl-1,4-piperazinylene terephthalamide) (5.6 denier/filament, drawn 4.5× in 50 lbs. steam) exhibit a loop tenacity of 0.8, a loop elongation of only 1.8, $TR_5=72$, $WR_5=49$.

EXAMPLE XXVIII

This example demonstrates the enhanced thermal stabilities of products of this invention. Tabulated below in Table III are thermogravimetric analysis (TGA) data both for polymers of this invention and for various prior art homologs. In the column entitled "Ti ° C." is listed the temperature at which is detected the initial loss in weight for each polymer tested, determined by procedures described hereinbefore. Unless otherwise indicated, all determinations are made in a nitrogen atmosphere. These data clearly indicate the excellent thermal stability of the polymers of this invention.

Meter Hours" indicates the number of hours of exposure required to cause a visually-observed yellowing of the films tested.

TABLE IV

| Item | Polymer source or unit | Fade-Ometer hours (at 165°F) |
|---|---|---|
| a | Example XIV | 335 |
| b | Example XVIII | 286 |
| c | Example VII | 234 |
| d | Example XIII | >1,000 |
| e | —N⟨ ⟩N—C(=O)—C₆H₄—C(=O)— | <100 |
| f | —N⟨CH₃⟩N⟨CH₃⟩—C(=O)—C₆H₄—C(=O)— | <24 |

TABLE III

| Item | Polymer source or unit | Ti, ° C. |
|---|---|---|
| Polyamides: | | |
| a | Example VII | 362 |
| b | Example XVI | 357 |
| c | Example XVIII | 388 |
| d | —N⟨ ⟩N—C(=O)—C₆H₄—C(=O)— | 314 |
| f | Example XIII | 350 |
| g | —N⟨ ⟩N—C(=O)(CH₂)₄—C(=O)— | 326 |
| Polyurethanes: | | |
| h | Example VIII | 343 |
| i | —N⟨ ⟩N—C(=O)—O(CH₂)₂—O—C(=O)— | 295 |
| j | Example IX | *311 |
| k | Example XXIV | *317 |
| l | Example XV | *309 |
| m | —N⟨ ⟩N—C(=O)—O—C₆H₂(Cl)₂—C(CH₃)₂—C₆H₂(Cl)₂—O—C(=O)— | *278 |

*Data determined in air atmosphere.

EXAMPLE XXIX

Shown below in Table IV are data which demonstrate the enhanced resistance to ultraviolet photolytic degradation possessed by films prepared from polymers of this invention; contrasting data are shown for films of two prior art polyamides derived from piperazines. These data are obtained by preparing 2,2,3,3-tetrafluoropropanol solutions of the respective polymers (10–15% solids), casting films from the solutions, and exposing the films to the light of a modified Fade-Ometer®, previously described. In Table IV, the column entitled "Fade-O-

I claim:
1. A polymer consisting essentially of recurring units having the structure

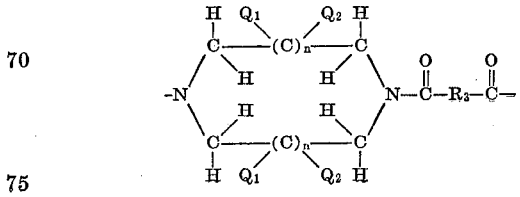

wherein $n$ is a cardinal number from 1 to 10; $Q_1$ and $Q_2$ are selected from the group of hydrogen, lower alkyl, and phenyl; and $R_3$ represents a divalent organic radical of up to about 20 carbon atoms which may contain up to about 6 atoms selected from the group of oxygen, nitrogen, sulfur, and halogen.

2. Poly(3,3,7,7 - tetramethyl-1,5-diazacyclooctane terephthalamide).

References Cited

UNITED STATES PATENTS

| | | | |
|---|---|---|---|
| 2,949,440 | 8/1960 | Katz | 260—78 |
| 2,970,987 | 2/1961 | Wittbecker | 260—77.5 |
| 2,996,482 | 8/1961 | Albert et al. | 260—78 |
| 3,284,392 | 11/1966 | Steinfink | 260—77.5 XR |
| 3,395,122 | 7/1968 | Morgan | 260—77.5 XR |

HOSEA E. TAYLOR, JR., Primary Examiner

M. J. WELSH, Assistant Examiner

U.S. Cl. X.R.

156—331; 260—77.5, 47, 239, 333, 33.8, 31.2, 33.4, 32.8, 32.6